(12) United States Patent
Miyanaga et al.

(10) Patent No.: US 10,851,691 B2
(45) Date of Patent: Dec. 1, 2020

(54) OIL MIST SEPARATOR

(71) Applicant: TOYOTA BOSHOKU KABUSHIKI KAISHA, Aichi-ken (JP)

(72) Inventors: Naritsune Miyanaga, Toyota (JP); Yoji Horiuchi, Kariya (JP); Hideto Morishita, Gifu (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/266,377

(22) Filed: Feb. 4, 2019

(65) Prior Publication Data
US 2019/0242281 A1  Aug. 8, 2019

(30) Foreign Application Priority Data
Feb. 7, 2018 (JP) .................... 2018-020076

(51) Int. Cl.
*F01M 13/04* (2006.01)
*B01D 45/08* (2006.01)

(52) U.S. Cl.
CPC ............ *F01M 13/04* (2013.01); *B01D 45/08* (2013.01); *F01M 2013/0433* (2013.01); *F01M 2013/0461* (2013.01)

(58) Field of Classification Search
CPC ........... F01M 13/04; F01M 2013/0433; F01M 2013/0461; B01D 45/08
See application file for complete search history.

(56) References Cited

U.S. PATENT DOCUMENTS

2004/0069287 A1* 4/2004 Matsuda ................ F02M 25/06
                                                      123/573
2010/0101514 A1* 4/2010 Hirano ................. F01M 13/022
                                                      123/41.86

FOREIGN PATENT DOCUMENTS

JP  2011-085057  4/2011

* cited by examiner

*Primary Examiner* — Syed O Hasan
(74) *Attorney, Agent, or Firm* — Greenblum & Bernstein, P.L.C.

(57) ABSTRACT

A case for an oil mist separator comprises an inlet and an outlet through which blow-by gas flows, a separation section for separating oil mist contained in the blow-by gas, and an oil discharge section disposed at a bottom portion of the case. The oil discharge section includes a first discharge part having a first discharge hole for discharging the separated oil, and a second discharge part surrounding the first discharge hole. The second discharge part includes a reservoir for storing the oil discharged from the first discharge hole, and a second discharge hole provided at a bottom portion of the reservoir. The second discharge part further includes a passage providing fluid communication between the inside and the outside of the second discharge part.

3 Claims, 3 Drawing Sheets

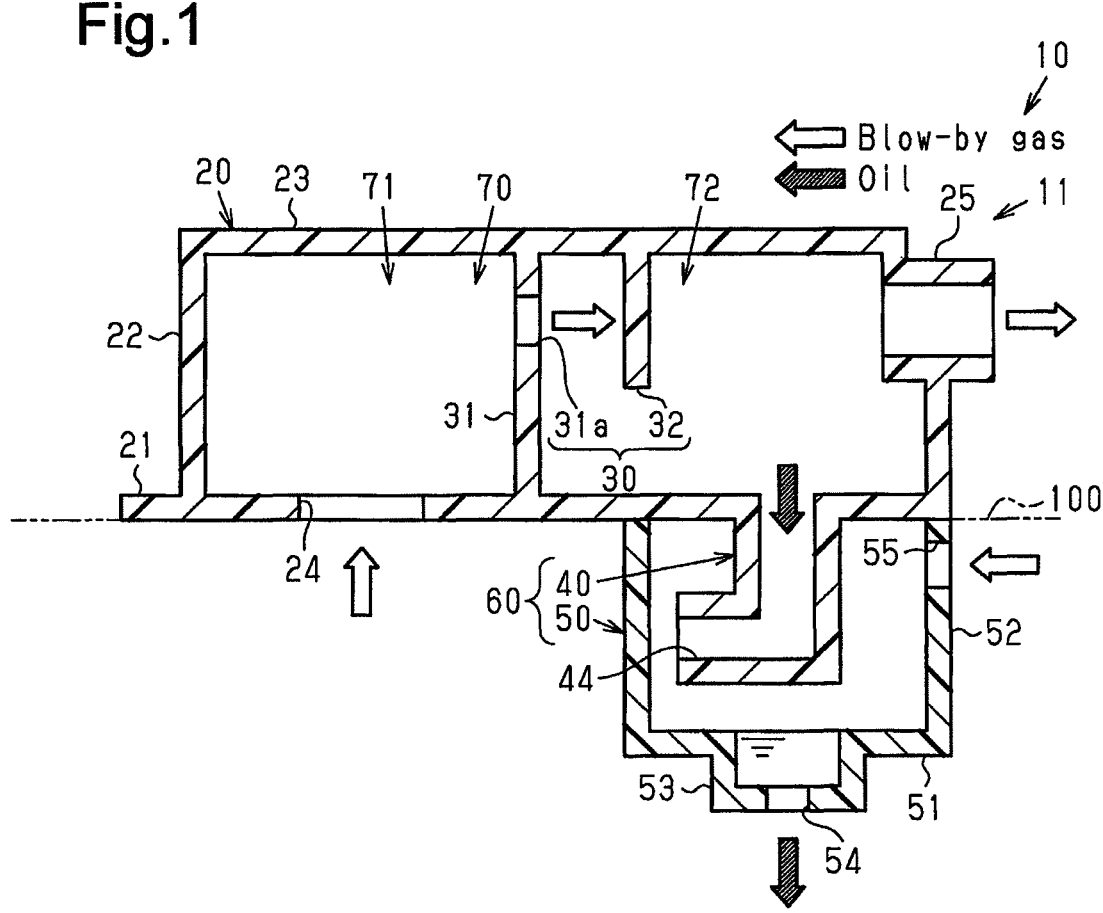
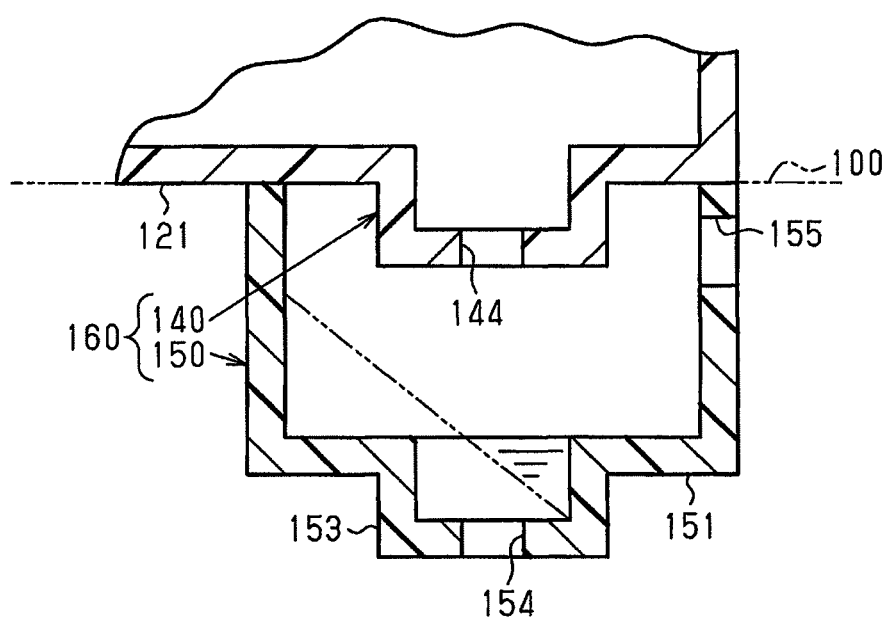

US 10,851,691 B2

OIL MIST SEPARATOR

BACKGROUND

1. Field

The present disclosure relates to an oil mist separator for separating oil mist contained in blow-by gas of an internal combustion engine.

2. Description of Related Art

A typical internal combustion engine has a recirculation passage for recirculating blow-by gas from a crankcase to an intake passage. The recirculation passage is provided with an oil mist separator for separating oil mist contained in the blow-by gas (see Japanese Patent Application Laid-open No. 2011-85057 (hereinafter "JP 2011-85057 A")). The oil mist separator has a drain with a drain hole for discharging the separated oil.

The oil mist separator disclosed in JP 2011-85057 A is provided inside a cylinder head cover. A camshaft splashes the oil into a space between a cylinder head and the cylinder head cover. The oil mist separator is configured to store the oil in the drain to liquid-seal the drain so that the splashed oil does not flow back into the oil mist separator through the drain hole. In the oil mist separator, the drain extends to the vicinity of the camshaft in order to store the oil in the drain promptly after the internal combustion engine is started. This facilitates storage of the oil splashed by the camshaft in the drain through the drain hole. The oil stored in the drain is kept in the drain in accordance with the balance among the self-weight of the oil, viscous force and surface tension of the oil, the pressure difference between the inside and outside of the oil mist separator, and the like.

SUMMARY

The oil mist separator disclosed in JP 2011-85057 A needs to have the drain extending in a vertical direction. Such a configuration raises a problem such as an increase in the size of the structure of the oil mist separator.

An object of the following description is to provide an oil mist separator that can be reduced in size.

According to one general aspect, a case for an oil mist separator comprises an inlet and an outlet through which blow-by gas flows, a separation section disposed inside the case and configured to separate oil mist contained in the blow-by gas, and an oil discharge section disposed at a bottom portion of the case and configured to discharge oil separated by the separation section to outside of the case. The oil discharge section includes a first discharge part having a first discharge hole for discharging the oil separated by the separation section, and a second discharge part surrounding the first discharge hole, and having a reservoir for storing the oil discharged from the first discharge hole and a second discharge hole provided at a bottom portion of the reservoir and configured to discharge the oil. The second discharge part further includes a passage providing fluid communication between the inside and the outside of the second discharge part.

Other features and aspects will be apparent from the following detailed description, the drawings, and the claims.

BRIEF DESCRIPTION OF THE DRAWINGS

FIG. 1 is a cross-sectional view of an oil mist separator according to an embodiment;

FIG. 2 is a cross-sectional view of an oil discharge section of an oil mist separator according to a first modification;

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 3:
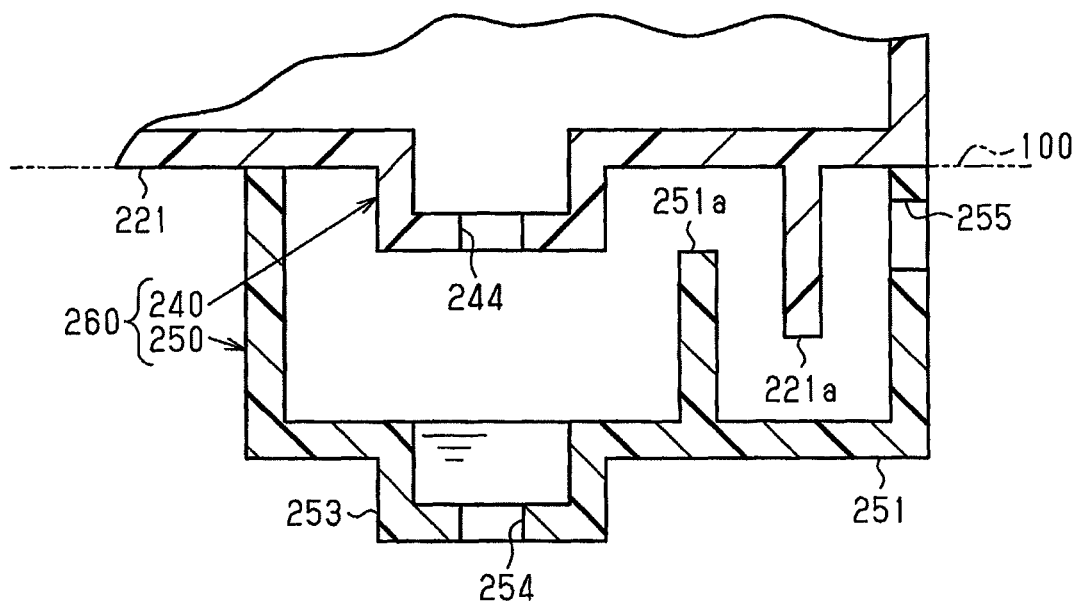
FIG. 3 is a cross-sectional view of an oil discharge section of an oil mist separator according to a second modification.

An embodiment of an oil mist separator is now described hereinafter with reference to FIG. 1.

The oil mist separator is provided in the middle of a recirculation passage (not shown) for recirculating blow-by gas from a crank room of an on-vehicle internal combustion engine to an intake passage (not shown).

As shown in FIG. 1, an oil mist separator 10 includes a case 11 constituting a part of a cylinder head cover 100. The case 11 includes a case main body 20 having a longitudinal direction (a lateral direction in FIG. 1) perpendicular to a vertical direction of the case 11, and a cover 50 attached to an underside of a first end portion (an end portion on the right-hand side in FIG. 1) of the case main body 20 in the longitudinal direction. The case main body 20 and the cover 50 each may be made of a hard resin material. The case main body 20 has a bottom wall 21, side walls 22 extending upward from the bottom wall 21, and a top wall 23 connected to upper ends of the side walls 22 and opposed to the bottom wall 21.

A second end portion (an end portion on the left-hand side in FIG. 1) on the side opposite to the first end portion in a longitudinal direction of the bottom wall 21 is provided with an inlet 24 communicating with a space between a cylinder head (not shown) and the cylinder head cover 100 and allowing the blow-by gas to flow in. A tubular outlet 25, through which the blow-by gas flows out, is provided in a protruding manner in the side wall 22 at the first end portion of the case main body 20. A hose (not shown) facilitating communication between the inside of the case 11 and the intake passage may be connected to the outlet 25.

A flow path 70 for the blow-by gas flowing from the inlet 24 toward the outlet 25 is formed inside the case main body 20.

A partition wall 31 is provided inside the case main body 20. The entire circumference of the partition wall 31 is connected to respective inner surfaces of the bottom wall 21, the side walls 22, and the top wall 23. The flow path 70 is divided into an upstream flow path 71 and a downstream flow path 72 by the partition wall 31. An upper part of the partition wall 31 is provided with a communication hole 31a for facilitating communication between the upstream flow path 71 and the downstream flow path 72. A collision wall 32 extending downward from the top wall 23 is arranged in the downstream flow path 72 so as to intersect with an axis of the communication hole 31a. In embodiments, the communication hole 31a and the collision wall 32 constitute a separation section 30 for separating oil mist contained in the blow-by gas.

The first end portion in the longitudinal direction of the bottom wall 21 is provided with a first discharge part 40. The first discharge part 40 is a tubular protrusion extending downward from the bottom wall 21. A tip portion of the first discharge part 40 is bent toward a second direction (to the left in FIG. 1) in the longitudinal direction. An opening of the tip portion of the first discharge part 40 constitutes a first discharge hole 44.

The cover 50 in the shape of a bottomed square cylinder, which surrounds the first discharge part 40, is attached to a bottom surface of the case main body 20.

The cover 50 is connected to the bottom wall 21 of the case main body 20 and has a square cylindrical side wall 52 protruding downward and a square plate-like bottom wall 51 connected to a lower end of the side wall 52 and opposed to the bottom wall 21.

A bottomed cylindrical reservoir 53 protruding downward is provided at the center of the bottom wall 51 of the cover 50. A bottom portion of the reservoir 53 is provided with a second discharge hole 54 for discharging oil accumulated in the reservoir 53 to the outside of the case 11. The passage cross-sectional area of the second discharge hole 54 is smaller than that of the reservoir 53.

The side wall 52 of the cover 50 is provided with a passage 55 for facilitating fluid communication between the inside and the outside of the cover 50. The passage 55 is disposed in an upper part of the side wall 52 farthest from the first discharge hole 44. The passage cross-sectional area of the passage 55 is larger than that of the second discharge hole 54. In embodiments, the cover 50 performs as a second discharge part. The first discharge part 40 of the case main body 20 and the cover 50 constitute an oil discharge section 60 that discharges the oil separated by the separation section 30 to the outside of the case 11.

Basic workings of the oil mist separator 10 are described next.

The blow-by gas in the crank room may flow into the space between the cylinder head and the cylinder head cover 100 through the recirculation passage (not shown) formed in a cylinder block (not shown) and the cylinder head (not shown).

Then, as shown in FIG. 1, the blow-by gas flows from the inlet 24 into the upstream flow path 71 formed inside the case main body 20.

The blow-by gas then passes through the communication hole 31a in the partition wall 31 and collides with the collision wall 32. Since the passage cross-sectional area of the communication hole 31a is smaller than that of the upstream flow path 71, the flow velocity of the blow-by gas increases when the blow-by gas passes through the communication hole 31a. Consequently, the oil mist contained in the blow-by gas adheres to the collision wall 32 and thus separated from the blow-by gas.

Thereafter, the blow-by gas from which the oil mist was separated is discharged from the outlet 25 to the intake passage via the hose.

The oil that was separated from the blow-by gas by the separation section 30 flows into the first discharge part 40 down the bottom wall 21 and then flows into the cover 50 through the first discharge hole 44. After flowing into the cover 50, the oil is stored in the reservoir 53 provided in the bottom wall 51 of the cover 50. The oil is kept in the reservoir 53 in accordance with the balance among the self-weight, viscous force, surface tension and the like of the oil. When the amount of the oil stored in the reservoir 53 exceeds a predetermined amount, the oil is discharged from the second discharge hole 54 to the outside of the cover 50.

Due to the presence of the passage 55 in the side wall 52 of the cover 50, the pressure difference between the inside and outside of the cover 50 is less likely to occur. If negative pressure in the case 11 increases and the pressure difference between the inside and the outside of the oil discharge section 60 becomes large while the engine is running, there is a possibility that the oil stored in the reservoir 53 is blown out and flows back into the case main body 20. Thus, the passage 55 helps to prevent an increase in the pressure difference between the inside and outside of the cover 50, thus preventing the oil from splashing out. In addition, since the reservoir 53 is capable of storing even a small amount of oil, the vertical dimension of the reservoir 53 can be reduced.

The embodiment described above has following advantages.

(1) The oil discharge section 60 includes the first discharge part 40 having the first discharge hole 44, and the cover 50 surrounding the first discharge hole 44. The oil separated by the separation section 30 is discharged from the first discharge hole 44. The cover 50 includes the reservoir 53 for storing the oil discharged from the first discharge hole 44, and the second discharge hole 54 provided at the bottom portion of the reservoir 53. In addition to the second discharge hole 54, the cover 50 includes the passage 55 providing fluid communication between the inside and the outside of the cover 50.

For the reasons described above, this configuration can reduce the vertical dimension of the reservoir 53, resulting in downsizing of the separator.

(2) The cover 50 includes the bottom wall 51 having the reservoir 53, and the side wall 52 extending upward from the bottom wall 51. The side wall 52 has the passage 55. The first discharge hole 44 of the first discharge part 40 is opened to the side opposite to the passage 55.

According to this configuration, since the oil that flows into the cover 50 from the passage 55 typically collides with and adheres to the outer surface of the first discharge part 40 and the inner surface of the cover 50, the oil is prevented from flowing directly into the first discharge hole 44.

(3) The cover 50 is attached to the case main body 20.

According to this configuration, the second discharge part can be realized by simply attaching the cover 50 to the case of an existing oil mist separator.

The embodiment described above may be modified as follows. The embodiment and the following modifications can be implemented in combination with each other so long as they do not conflict technically.

In the first to fifth modifications shown in FIGS. 2 to 6, respectively, the same components as those of the above embodiment are given the same reference numerals. Like reference numerals to those used in the above embodiment are used with the prefix "1," "2," "3," "4," or "5" to denote like components, and redundant explanations are omitted.

As shown in FIG. 2, a first discharge hole 144 may be arranged on the same axis as a second discharge hole 154 of a cover 150.

In this case, even when the oil is distributed unevenly in the cover 150 as shown by a double-dashed chain line in FIG. 2 due to, for example, the oil mist separator being tilted while the vehicle travels on an inclined road or due to centrifugal force applied by a swinging motion of the vehicle, a certain amount of space is available between the surface of the oil and the first discharge hole 144. As a result, the oil stored in a reservoir 153 can be prevented from flowing into the case main body from the first discharge hole 144.

As shown in FIG. 3, baffle plates 251a and 221a may be disposed between a passage 255 and a first discharge hole 244 in a cover 250.

By doing so, the oil mist flowing in from the passage 255 collides with and adheres to the baffle plates 221a and 251a. As a result, the oil mist is prevented from flowing back into the case main body through the first discharge hole 244. The number of baffle plates in an oil discharge section 260 is not limited to two, and it may be one, three, or more than three.

Figure 4:
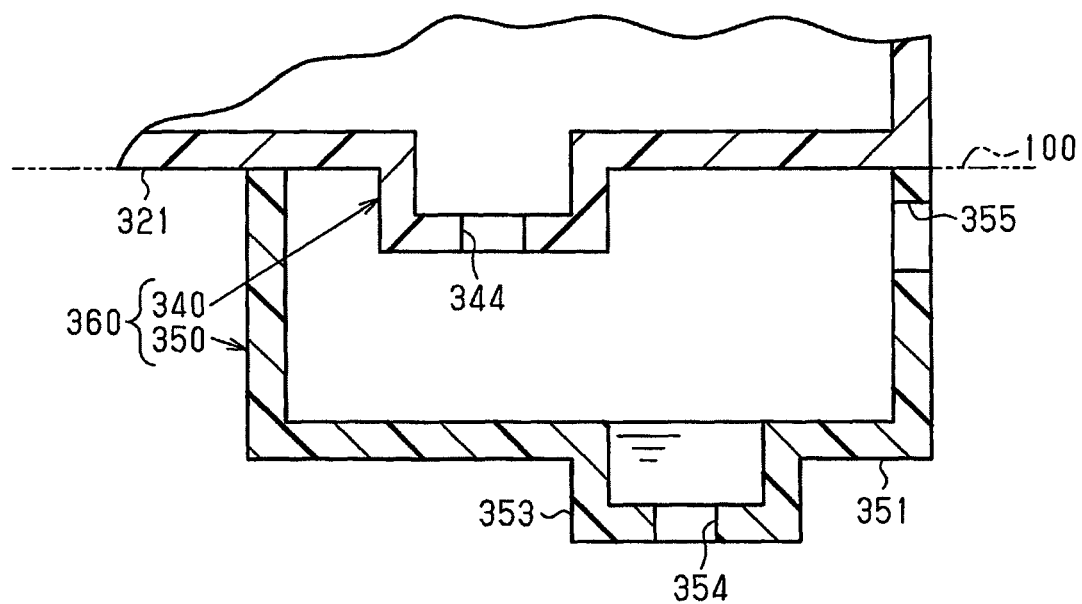
FIG. 4 is a cross-sectional view of an oil discharge section of an oil mist separator according to a third modification.

As shown in FIG. 4, a first discharge hole 344 may be provided at a position shifted from an axis of a second discharge hole 354. By doing so, the oil that flows into a cover 350 through the second discharge hole 354 may be prevented from flowing directly into the first discharge hole 344.

Figure 5:
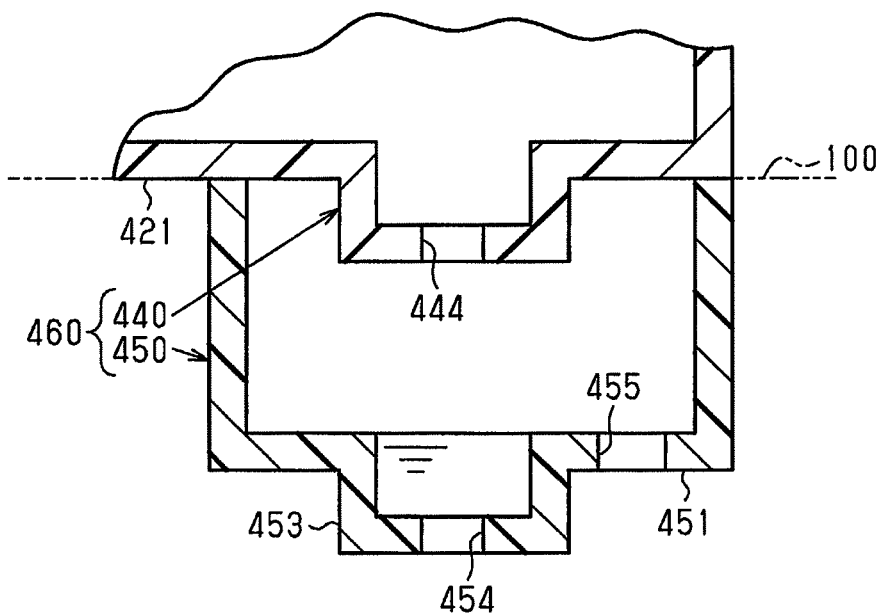
FIG. 5 is a cross-sectional view of an oil discharge section of an oil mist separator according to a fourth modification.

As shown in FIG. 5, a passage 455 may be formed in a bottom wall 451 of a cover 450. In this case, the passage 455 may be provided at a position in the bottom wall 451 with which the splashed oil is not likely to come into contact.

Figure 6:
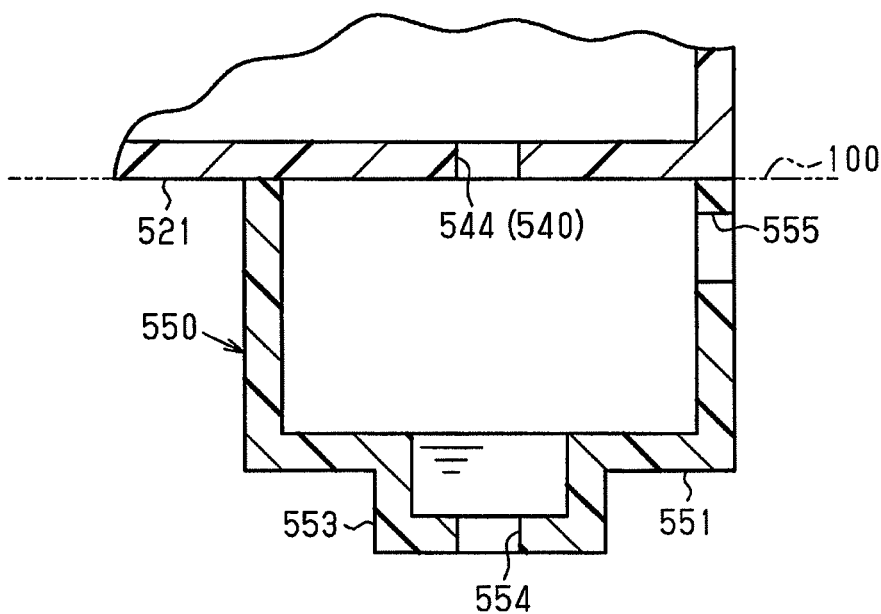
FIG. 6 is a cross-sectional view of an oil discharge section according to an oil mist separator according to a fifth modification.

It is not necessary for the first discharge part to protrude downward from the bottom wall of the case main body. For example, as shown in FIG. 6, a first discharge hole 544 may be provided in a bottom wall 521 of the case main body. In this case, the first discharge hole 544 acts as a first discharge part 540.

The cover 50 does not have to be in the shape of a bottomed square cylinder; the shape of the cover 50 may be changed as appropriate. For example, the cover 50 may be in the shape of a bottomed circular cylinder.

The tip portion of the first discharge part 40 may be tilted downward. Such a configuration allows the oil separated by the separation section 30 to readily flow from the first discharge part 40 into the cover 50 by its own weight. Consequently, the efficiency of discharging the oil is improved.

The number and the shape of the passage 55 may be changed as appropriate.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Therefore, the scope of the disclosure is defined not by the detailed description, but by the claims and their equivalents, and all variations within the scope of the claims and their equivalents are to be construed as being included in the disclosure.

What is claimed is:

1. A case for an oil mist separator, the case comprising:
an inlet and an outlet through which blow-by gas flows;
a separation section disposed inside the case and configured to separate oil mist contained in the blow-by gas; and
an oil discharge section disposed at a bottom portion of the case and configured to discharge oil separated by the separation section to outside of the case, wherein the oil discharge section includes:
a first discharge part having a first discharge hole for discharging the oil separated by the separation section; and
a second discharge part surrounding the first discharge hole, and having a reservoir for storing the oil discharged from the first discharge hole and a second discharge hole provided at a bottom portion of the reservoir and configured to discharge the oil,
the second discharge part further includes:
a bottom wall having the reservoir; and
a side wall extending upward from the bottom wall and having a passage providing fluid communication between an inside and an outside of the second discharge part, and
the first discharge hole is opened to a side opposite to the passage on the side wall.

2. The case according to claim 1, wherein the first discharge hole is disposed on a same axis as the second discharge hole.

3. The case according to claim 1, further comprising a baffle plate disposed within the second discharge part and between the passage and the first discharge hole.

* * * * *